(12) United States Patent
Wiesler et al.

(10) Patent No.: US 6,249,957 B1
(45) Date of Patent: *Jun. 26, 2001

(54) METHOD OF PRODUCING A ROTOR

(75) Inventors: Martin Wiesler, Baden-Baden/Neuweier; Klaus Maldener, Lauf; Martin Kiefer, Oberkirch; Lothar Fauth, Buhl; Hans Kobschaetzky, Renchen; Dieter Kern, Buehlertal, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/171,534

(22) PCT Filed: Dec. 5, 1997

(86) PCT No.: PCT/DE97/02839

§ 371 Date: Oct. 21, 1998

§ 102(e) Date: Oct. 21, 1998

(87) PCT Pub. No.: WO98/37613

PCT Pub. Date: Aug. 27, 1998

(30) Foreign Application Priority Data

Feb. 21, 1997 (DE) .............................. 197 06 851

(51) Int. Cl.$^7$ ..................... H01R 43/06; H02K 15/10; B05D 3/00

(52) U.S. Cl. .............. 29/597; 29/598; 427/386; 427/461; 156/293; 310/45

(58) Field of Search ............... 29/597, 598; 427/386, 427/461; 310/42, 43, 45; 156/293, 294; 239/690

(56) References Cited

U.S. PATENT DOCUMENTS

| | | | |
|---|---|---|---|
| 2,822,483 | * 2/1958 | Jean et al. | 310/43 |
| 2,846,599 | * 8/1958 | McAdam | 310/42 |
| 3,498,260 | * 3/1970 | De Jean et al. | 118/70 |
| 3,737,987 | * 6/1973 | Bednarski | 29/598 |
| 3,778,892 | * 12/1973 | Ostroski | 29/597 |
| 4,104,416 | * 8/1978 | Parthasarathy et al. | 427/461 |

(List continued on next page.)

FOREIGN PATENT DOCUMENTS

| | | | |
|---|---|---|---|
| 4034277 | * 10/1989 | (DE) | 29/597 |
| 365233 | * 4/1990 | (EP) | 29/597 |
| 2003674 | * 3/1979 | (GB) | 29/597 |

OTHER PUBLICATIONS

Miszczyk et al, Laboratory evaluation of epoxy coatings with an adhesion promotor by impedance, Process in Organic Coatings, pp. 357–363, Nov. 1994.*

Primary Examiner—Lee Young
Assistant Examiner—A. Dexter Tugbang
(74) Attorney, Agent, or Firm—Ronald E. Greigg; Edwin E. Greigg

(57) ABSTRACT

In rotors for electric motors, it is usual to fix the commutator on the rotor shaft by a press fit. In the present invention, the rotor shaft, with the rotor core fixed thereon, is electrostatically coated with an epoxy layer on opposite portions of the rotor shaft and in the winding slots, and is then heated to the plasticizing and curing temperature of the epoxy. After that, by a sliding tool, the commutator, whose inner bore has a clearance fit relative to the rotor shaft, is slipped onto the rotor shaft in a terminal position, in the process the still-viscous epoxy is pushed backward and is deposited radially on a connecting end face, forming a bead, and penetrates the annular gap between the inner bore and the rotor shaft. Once the epoxy layer has cooled, the commutator is fixed against rotation and displacement on the rotor shaft. The rotor is suitable for electric motors of various types.

2 Claims, 1 Drawing Sheet

U.S. PATENT DOCUMENTS

| | | | |
|---|---|---|---|
| 4,263,711 | * | 4/1981 | Sakano et al. .......................... 29/597 |
| 4,818,910 | * | 4/1989 | Resienweber .......................... 310/42 |
| 4,977,343 | * | 12/1990 | Wang .................................... 310/42 |
| 4,996,456 | * | 2/1991 | Strobl .................................... 310/42 |
| 5,518,546 | * | 5/1996 | Williams et al. .................... 427/461 |
| 5,558,735 | * | 9/1996 | Rettew et al. ........................ 427/386 |
| 5,710,214 | * | 1/1998 | Chou et al. ........................... 427/386 |
| 5,727,307 | * | 3/1998 | Gstohl et al. .......................... 29/597 |
| 5,778,512 | * | 7/1998 | Ichikawa et al. ...................... 29/598 |

* cited by examiner

METHOD OF PRODUCING A ROTOR

Prior Art

The invention is based on a rotor and a method for producing a rotor. A rotor is already known (German Patent DE 37 28 000 C2), in which the rotor core is covered by an end disk on each face end that, on its face toward the rotor core and toward the rotor shaft has flow conduits, into which a winding impregnating agent can be introduced that after curing has taken place serves as an additionally effective stabilizing agent.

ADVANTAGES OF THE INVENTION

The rotor according to the invention and the method according to the invention for producing a rotor, has the advantage that a fixation of the commutator is possible in a simple way by means of the insulating agent (epoxy-based coating powder) applied to the rotor shaft and the rotor core. For that purpose, the inner bore of the commutator can be manufactured with a clearance fit or transition fit relative to the rotor shaft, and as a result on assembly the commutator can be slipped, fitting smoothly onto the rotor shaft, and both damage to the surface of the rotor shaft and internal stresses in the commutator are avoided, because the usual embodiment of the inner bore of the commutator with a press fit relative to the rotor shaft in the prior art has the danger of scratching the surface of the rotor shaft. The insulating layer applied moreover increases the axial retention forces of the rotor core, as a rule built up from lamination sheets, on the rotor shaft; that is, the rotor core is additionally mechanically held by the insulating layer.

By means of the provisions recited herein, advantageous refinements of and improvements to the rotor and the method disclosed are possible. It is advantageous to embody the at least one recess of the commutator as a conical face that tapers from the connecting end face toward the inner bore, which makes easier penetration of the plasticized epoxy between the inner bore of the commutator and the rotor shaft possible, which leads to an improvement in the fixation of the commutator on the rotor shaft.

It is also advantageous to cover the rotor winding and the connecting wires, leading from the rotor winding to the commutator and joined to the commutator, with a second sintered epoxy layer, which not only protects against damage and aggressive media, but also effects an additional fixation of the rotor winding, which in turn prevents vibration-caused breakage.

BRIEF DESCRIPTION OF THE DRAWING

One exemplary embodiment of the invention is shown in simplified form in the drawing and described in further detail in the ensuing description.

DESCRIPTION OF THE EXEMPLARY EMBODIMENT

Figure 1:
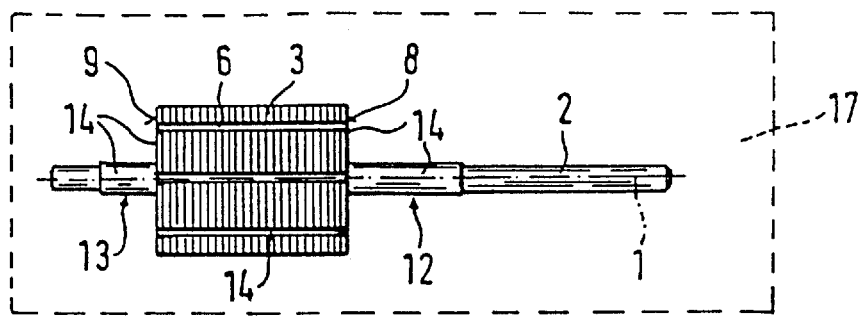
FIG. 1 shows a rotor with an epoxy layer.
Figure 2:
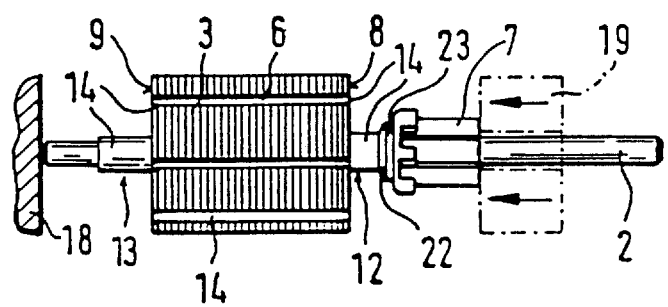
FIG. 2 shows a rotor with a commutator slipped onto the rotor shaft.
Figure 3:
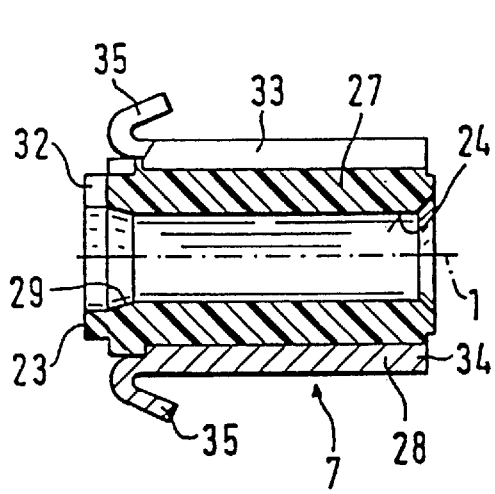
FIG. 3 shows a commutator in longitudinal section, taken along the line III—III in FIG. 4.
Figure 4:
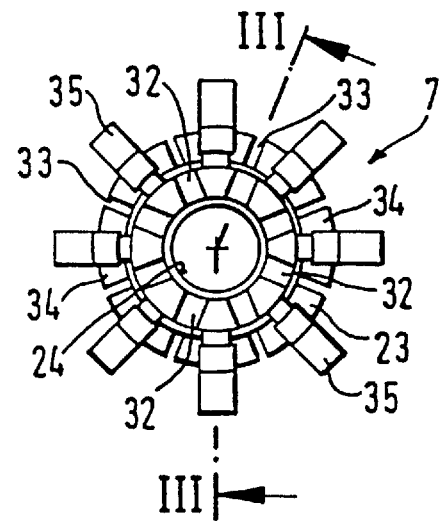
FIG. 4 shows a commutator of FIG. 3 in an end view.

FIG. 1 shows a rotor for an electric motor, having a longitudinal axis 1, a rotor shaft 2 extending coaxially with it, and a rotor core 3 slipped with a press fit coaxially onto the rotor shaft 2. The rotor core 3 is a package of individual laminated sheets in a known manner, and has a plurality of winding slots 6, extending parallel to the longitudinal axis 1, which as shown in FIG. 2 extend from a first end face 8, facing toward a commutator 7, to a second end face 9 of the rotor core 3, remote from the commutator 7. The winding slots 6, the first end face 8, and the second end face 9 of the rotor core 3, and a first portion 12 of the rotor shaft 2 located between the rotor core 3 and the commutator 7, as well as a second portion 13 of the rotor shaft 2, remote from the commutator 7 and adjoining the rotor core 3, are covered with a centered epoxy layer 14. For that purpose, the rotor, without the commutator, is covered with masks in the regions of the rotor shaft 2 and rotor core 3 that are not to be provided with an epoxy layer 14, and the thus-equipped rotor is introduced into a coating system 17, indicated by dashed lines, in which electrostatically charged epoxy powder in a fluidized powder bed is deposited on those regions of the rotor shaft 2 and rotor core 3 that are not covered by masks, so that the portions 12 and 13 of the rotor shaft 2, along with the first end face 8, the second end face 9 and the winding slots 6 of the rotor core 3, are covered with a layer of epoxy powder. The outer jacket of the rotor core 3 is covered as well. This powder layer on the outer jacket of the rotor core is removed in an ensuing operation by means of blowing, suction or stripping, so that the outer jacket is powder-free. After that, the temperature in the coating system 17 is increased until such time as the epoxy powder has heated up to its plasticizing and curing temperature, which is at approximately 240° C., and at which the epoxy powder becomes a viscous mass. In this state, the commutator 7 is slipped by means of a sliding tool 19, represented by dot-dashed lines, onto the rotor shaft 2 that rests near its second portion 13 on a retaining stop 18, in such a way that the viscous epoxy layer 14 present on the first portion 12 of the rotor shaft 2 partly curves radially outward in the manner of a bead 22 on a connecting end face 23 of the commutator 7 and penetrates an annular gap formed between the circumference of the rotor shaft 2 and the wall of an inner bore 24 (see FIGS. 3 and 4). Once the epoxy has cured and the rotor has cooled down, the commutator 7 is fixed in the axial direction and secured against rotation solely by the epoxy 14 on the rotor shaft 2. As shown in FIGS. 3 and 4, the commutator 7 has a commutator core 27 made of a duroplastic, which us surrounded by a metal conductor sleeve 28, made particularly from copper. The inner bore 24, which has a clearance or transition fit relative to the circumference of the rotor shaft 2, extends in the commutator core 27.

Figure 5:
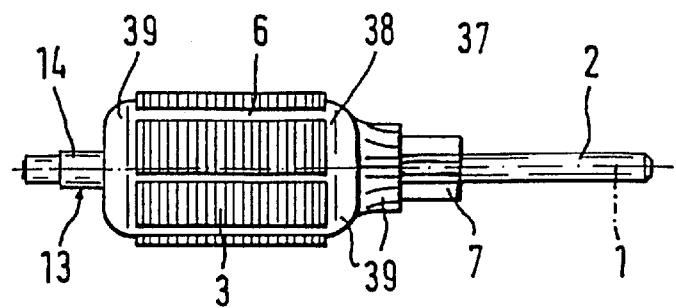
FIG. 5 shows a rotor with a second epoxy layer.

Beginning at the connecting end face 23, the commutator 7 has a recess 29, which extends toward the inner bore in the direction of the longitudinal axis and which is shown in FIG. 3 as a conical face 29 tapering toward the inner bore 24. However, the recess 29 may also be embodied as a longitudinal groove leading to the inner bore 24. The recess, for instance in the form of the conical face 29 that tapers toward the inner bore 24, makes easy, uniform penetration of the viscous epoxy into the annular gap formed between the rotor shaft 2 and the inner bore 24 possible. For better fixation of the commutator 7 in the direction of rotation, indentations 32 in the commutator core 27 are provided on the connecting end face 23 of the commutator 7, which for instance begin at the recess 29 and extend as far as the circumference of the commutator core 27. The cross section of the indentations 32 may be rectangular, triangular, semicircular, or the like. The bead 22 of epoxy 14 radially covers the indentations 32 and digs into them. Commutator slots 33 extending in the direction of the longitudinal axis sever the conductor sleeve 28 to form individual segments 34, electrically insulated from one another, that each have a respective connecting hook 35 toward the connecting end face 23. One connecting wire 37 of the rotor winding 38 shown in FIG. 5 is electrically connected to each connecting hook 35 by clamping. Once the rotor winding 38 has been inserted into the winding slots 6 of the rotor core 3 and the connecting wires 37 have been connected to the connecting hooks 35 of the commutator 7, the rotor is reintroduced into the coating system 17 and recoated electrostatically with epoxy powder on the rotor winding 38 and the connecting wires 37, and then heated to the plasticizing and curing temperature, as a result of which a second epoxy layer 39 is sintered on that covers the rotor winding 38 and the connecting wires 37 and thus fixes them; this improves both the resistance to jarring and the protection against aggressive media. Naturally, the second epoxy layer 39 in the process is also deposited on the first portion 12 of the rotor shaft 2 and on both the connecting end face 23 and the connecting hooks 35 of the commutator 7.

The foregoing relates to a preferred exemplary embodiment of the invention, it being understood that other variants and embodiments thereof are possible within the spirit and scope of the invention, the latter being defined by the appended claims.

What is claimed is:

1. A method for producing a rotor for an electric motor, which has a rotor shaft coaxially to a longitudinal axis, a rotor core, and a commutator, wherein the rotor core has winding slots for at least one rotor winding that can be disposed therein and a first end face, toward the commutator, and a second end face, remote from the commutator, and the rotor shaft has a first portion located between the rotor core and the commutator and a second portion beginning at the second end face of the rotor core and remote from the commutator, and the commutator has a connecting end face toward the rotor core and an inner bore coaxial with the longitudinal axis, and an annular gap is formed between the circumference of the rotor shaft and a wall of the inner bore (24), the method comprising press-fitting the rotor core (3) onto the rotor shaft (2), subsequent to press-fitting the rotor core onto the rotor shaft (2) electrostatically coating the first portion (12) and the second portion (13) of the rotor shaft (2) the first end face (8), the second end face (9), and the winding slots (6) of the rotor core (3) with epoxy powder (14), subsequent to coating with the epoxy powder, heating the epoxy powder (14) to a plasticizing and curing temperature, subsequent to heating the epoxy powder slipping the commutator (7) to a terminal position onto the rotor shaft (2), while slipping the commutator (7) to said terminal position onto the rotor shaft, the connecting end face of the commutator shifts some of the plasticized epoxy (14) from said first portion (12) of the rotor shaft (2) toward the rotor core and some of said shifted epoxy coating is deposited radially outward as a bead (22) on the connecting end face (23) and some of said shifted epoxy coating penetrates said annular gap formed between the circumference of the rotor shaft (2) and the wall of the inner bore (24).

2. The method according to claim 1, which comprises introducing at least one rotor winding (38) into the winding slots and after introducing the at least one rotor winding (38) into the winding slots (6) of the rotor core (3), electrostatically coating the rotor winding (38), and a plurality of connecting wires (37) leading from the rotor winding (38) and connected to the commutator, and the connecting end face (23) of the commutator (7) with epoxy powder (39), and after electrostatically coating with epoxy powder the epoxy powder (39) is heated to a plasticizing and curing temperature.

* * * * *